United States Patent
Kim (10) Patent No.: US 11,554,808 B2
(45) Date of Patent: Jan. 17, 2023

(54) APPARATUS AND METHOD FOR CONTROLLING MOTOR-DRIVEN POWER STEERING SYSTEM

(71) Applicant: HYUNDAI MOBIS Co., Ltd., Seoul (KR)

(72) Inventor: Tae Hong Kim, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 320 days.

(21) Appl. No.: 17/093,356

(22) Filed: Nov. 9, 2020

(65) Prior Publication Data

US 2021/0331734 A1    Oct. 28, 2021

(30) Foreign Application Priority Data

Apr. 23, 2020 (KR) .................. 10-2020-0049327

(51) Int. Cl.
*B62D 5/04* (2006.01)
*B62D 6/00* (2006.01)
*B62D 1/28* (2006.01)

(52) U.S. Cl.
CPC .............. *B62D 5/046* (2013.01); *B62D 1/286* (2013.01); *B62D 6/00* (2013.01)

(58) Field of Classification Search
CPC .......... B62D 5/046; B62D 1/286; B62D 6/00; B62D 15/025; B60W 10/20; B60W 50/082; B60W 60/001; B60W 2050/0011; B60W 2050/0022; B60W 2050/0052; B60W 2510/202; B60W 2540/18; G05D 1/0061; G05D 1/0088; G05D 1/021; G05D 2201/0213

(Continued)

(56) References Cited

U.S. PATENT DOCUMENTS 9,387,877 B2    7/2016   Tsubaki
10,059,369 B2   8/2018   Nejo et al.

(Continued)

FOREIGN PATENT DOCUMENTS

JP      2017206252       11/2017
KR      10-2017-0065793   6/2017
WO      2016199839       12/2016

*Primary Examiner* — Scott A Reinbold
(74) *Attorney, Agent, or Firm* — H.C. Park & Associates, PLC (57) ABSTRACT

An apparatus for controlling an MDPS system may include an MDPS-basic logic unit determining a first auxiliary command current for driving an MDPS motor in a manual driving mode, based on column torque applied to a steering column of a vehicle and a vehicle speed, an autonomous driving steering controller determining a second auxiliary command current for driving the MDPS motor in an autonomous driving mode, and a mode change controller determining a driver's steering intervention using a variable reference time variably determined based on the column torque in the manual driving mode, determining a mode change time from the autonomous driving mode to the manual driving mode based on the column torque, and determining a final auxiliary command current for driving the MDPS motor upon mode change, by applying, to the first and second auxiliary command currents, a weight into which the mode change time is incorporated.

18 Claims, 3 Drawing Sheets

(58) Field of Classification Search
USPC .......................................................... 180/446
See application file for complete search history.

(56) References Cited

U.S. PATENT DOCUMENTS

2019/0193776 A1* 6/2019 Tsubaki ............. B62D 15/0235
2019/0210638 A1* 7/2019 Ueno ....................... B62D 5/04
2019/0225260 A1* 7/2019 Tsubaki ................. B62D 6/002
2019/0300044 A1* 10/2019 Tsubaki ................... B62D 5/04

* cited by examiner

APPARATUS AND METHOD FOR CONTROLLING MOTOR-DRIVEN POWER STEERING SYSTEM

CROSS-REFERENCE TO RELATED APPLICATION

This application claims priority from and the benefit of Korean Patent Application No. 10-2020-0049327, filed on Apr. 23, 2020, which is hereby incorporated by reference for all purposes as if set forth herein.

BACKGROUND

Field

Exemplary embodiments of the present disclosure relate to an apparatus and method for controlling a motor-driven power steering (MDPS) system, and more particularly, to an apparatus and method for controlling an MDPS system, wherein an MDPS motor is controlled in consideration of an autonomous driving mode and manual driving mode of a vehicle.

Discussion of the Background

Power steering of a vehicle is a steering apparatus based on electric power, and functions to assist a driver's manipulation of a steering wheel. For such power steering, a method of using hydraulic pressure is chiefly used. Recently, however, a motor-driven power steering (MDPS) system, that is, a method of using the power of a motor, is increasingly used. The reason for this is that the MDPS system has advantages in that it has light weight, occupies a small space, and requires no oil change compared to the existing hydraulic power steering system.

The MDPS system determines a driving condition of a vehicle through a torque sensor for measuring a steering torque of a driver input to a steering wheel, a steering angle sensor for measuring the steering angle or steering angular velocity of the steering wheel, and a vehicle speed sensor for measuring a vehicle speed, and provides an auxiliary torque through an electric motor based on the steering torque applied to a steering shaft when the driver steers the steering wheel.

An autonomous vehicle controls an operation of an MDPS system applied thereto, by recognizing a road environment in which the vehicle travels through autonomous driving modules (e.g., a camera sensor, a radar sensor, and a lidar sensor) in an autonomous driving mode and determining a command steering angle and a command torque necessary for the operation of the MDPS system.

In this case, a situation, such as a situation in which a sudden malfunction occurs in the autonomous driving module or manual steering for urgent avoidance driving is required, may occur in which a driver must hold and steer a steering wheel at his or her own will, if necessary. In this case, if the state in which a steering torque is a given level or more is maintained for a given time, a conventional MDPS system determines that the driver's steering intervention has occurred and operates to release the autonomous driving mode. However, the conventional method of determining a driver's steering intervention has limitations in that rapid release of the autonomous driving mode and a rapid entry into a manual driving mode upon sudden steering are impossible because a given time must be unconditionally maintained regardless of a steering torque applied by the driver.

Furthermore, if location control of MDPS based on the autonomous driving modules continues to be performed although the driver forcibly steers the steering wheel, an accident may be caused because the vehicle is not controlled as intended by the driver. Accordingly, in a conventional technology, a method of determining a driver's steering intention based on the size of column torque or a change in the phase difference between a steering angle sensor and a motor angle sensor is taken into consideration. In this case, however, in a process of performing location control of MDPS in the autonomous driving mode, the driver may feel a sense of difference in steering because a motor control current is greatly changed due to the occurrence of a driver's sudden steering. That is, when a mode changes from the autonomous driving mode to the manual driving mode, instant control stability is reduced due to an output difference in each mode control situation. This may lead to a sense of difference, such as an abnormal behavior or steering vibration of the vehicle.

The Background Art of the present disclosure was disclosed in Korean Patent Application Laid-Open No. 10-2017-0065793 (Jun. 14, 2017).

The above information disclosed in this Background section is only for enhancement of understanding of the background of the invention and, therefore, it may contain information that does not constitute prior art.

SUMMARY

Exemplary embodiments of the inventive concepts provide the provision of an apparatus and method for controlling a motor-driven power steering system, which enables rapid release of an autonomous driving mode and a rapid entry into a manual driving mode upon sudden steering by improving a problem with a conventional MDPS system in which when a mode changes from the autonomous driving mode to the manual driving mode, a given time must be unconditionally taken, and which can solve the problem of a reduction in instant control stability for MDPS occurring due to an output difference in each mode control situation and the problem of occurrence of a sense of difference, such as an abnormal behavior or steering vibration of a vehicle.

In an embodiment, an apparatus for controlling a motor-driven power steering (MDPS) system includes an MDPS-basic logic unit configured to determine a first auxiliary command current for driving an MDPS motor in a manual driving mode of a driver, based on column torque applied to a steering column of a vehicle and a vehicle speed of the vehicle, an autonomous driving steering controller configured to determine a second auxiliary command current for driving the MDPS motor in an autonomous driving mode of the vehicle, and a mode change controller configured to determine a driver's steering intervention using a variable reference time variably determined in accordance with the column torque in the autonomous driving mode of the vehicle, determine a mode change time from the autonomous driving mode to the manual driving mode based on the column torque, and determine a final auxiliary command current for driving the MDPS motor upon change from the autonomous driving mode to the manual driving mode, by applying, to the first and second auxiliary command currents, a weight into which the mode change time is incorporated.

In an embodiment, the mode change controller may determine that the driver's steering intervention has occurred if the state in which the column torque is a preset reference torque or more is maintained for the variable reference time or more, and determine the variable reference time as a smaller value as the column torque becomes greater.

In an embodiment, the mode change controller may determine the mode change time based on determination column torque, which is column torque at timing at which the driver's steering intervention is determined to have occurred, and determine the mode change time as a smaller value in at least a part of the region of the determination column torque, as the determination column torque becomes greater.

In an embodiment, the mode change controller may determine the final auxiliary command current by complementarily applying the weight to each of the first and second auxiliary command currents, and determine the final auxiliary command current so that the final auxiliary command current becomes closer from the second auxiliary command current to the first auxiliary command current as a value of the weight changes from a lower value to a higher value.

In an embodiment, as the weight varies within a range between a preset lower limit or more and a preset upper limit or less using the mode change time as a factor, the mode change controller may complete the change from the autonomous driving mode to the manual driving mode within the mode change time.

In an embodiment, the mode change controller may filter the column torque in a frequency band, which is determined based on a steering angular acceleration of a steering wheel of the vehicle and determined to include a resonant frequency caused based on a mechanical mechanism of the MDPS system mounted on the vehicle, and determine the driver's steering intervention based on the filtered column torque.

In an embodiment, the autonomous driving steering controller may determine the second auxiliary command current in such a way to perform location control of the MDPS motor through proportional integral differential (PID) control based on a command steering angle determined depending on a driving environment of the vehicle, and determine the second auxiliary command current using a variable high pass filter (HPF), having a cutoff frequency variably determined based on an angular velocity of the command steering angle, and a differential (D) control gain calculated based on a location control gain of the PID control and a differential parameter.

In an embodiment, the mode change controller may perform a limit process of limiting the determination on the driver's steering intervention based on the column torque and the variable reference time, based on an angular acceleration of a command steering angle determined depending on the driving environment of the vehicle.

In an embodiment, the mode change controller may perform the limit process using a method of increasing the variable reference time as the angular acceleration of the command steering angle becomes greater, or a method of stopping the determination on the driver's steering intervention based on the column torque and the variable reference time when the angular acceleration of the command steering angle is a preset reference value or more.

In an embodiment, a method of controlling a motor-driven power steering (MDPS) system includes determining, by a mode change controller, whether a driver's steering intervention has occurred, based on a variable reference time variably determined in accordance with column torque applied to a steering column of a vehicle in an autonomous driving mode of the vehicle, determining, by the mode change controller, a mode change time from the autonomous driving mode to a manual driving mode of the driver based on the column torque if the driver's steering intervention is determined to have occurred, and determining, by the mode change controller, a final auxiliary command current for driving an MDPS motor upon change from the autonomous driving mode to the manual driving mode, by applying, to first and second auxiliary command currents, a weight into which the mode change time is incorporated, wherein the first and second auxiliary command currents are currents for driving the MDPS motor in the manual driving mode and the autonomous driving mode, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 1:
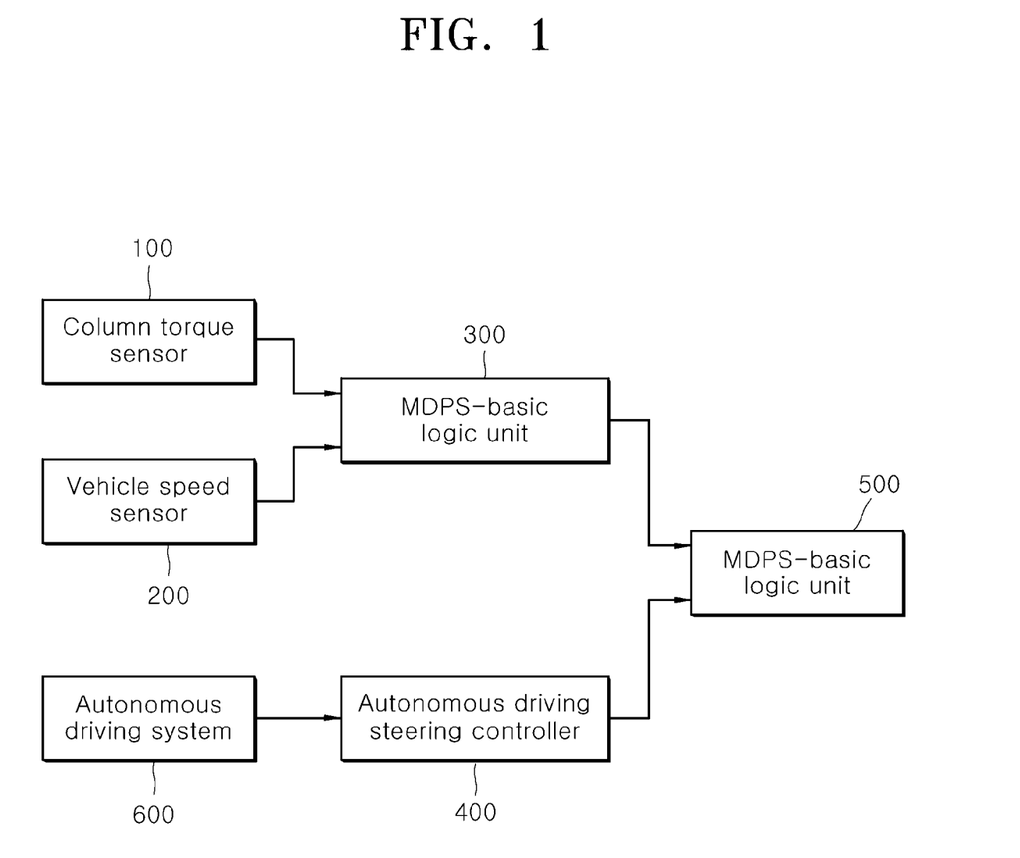
FIG. 1 is a block diagram illustrating an apparatus for controlling a motor-driven power steering (MDPS) system according to an embodiment of the present disclosure.
Figure 2:
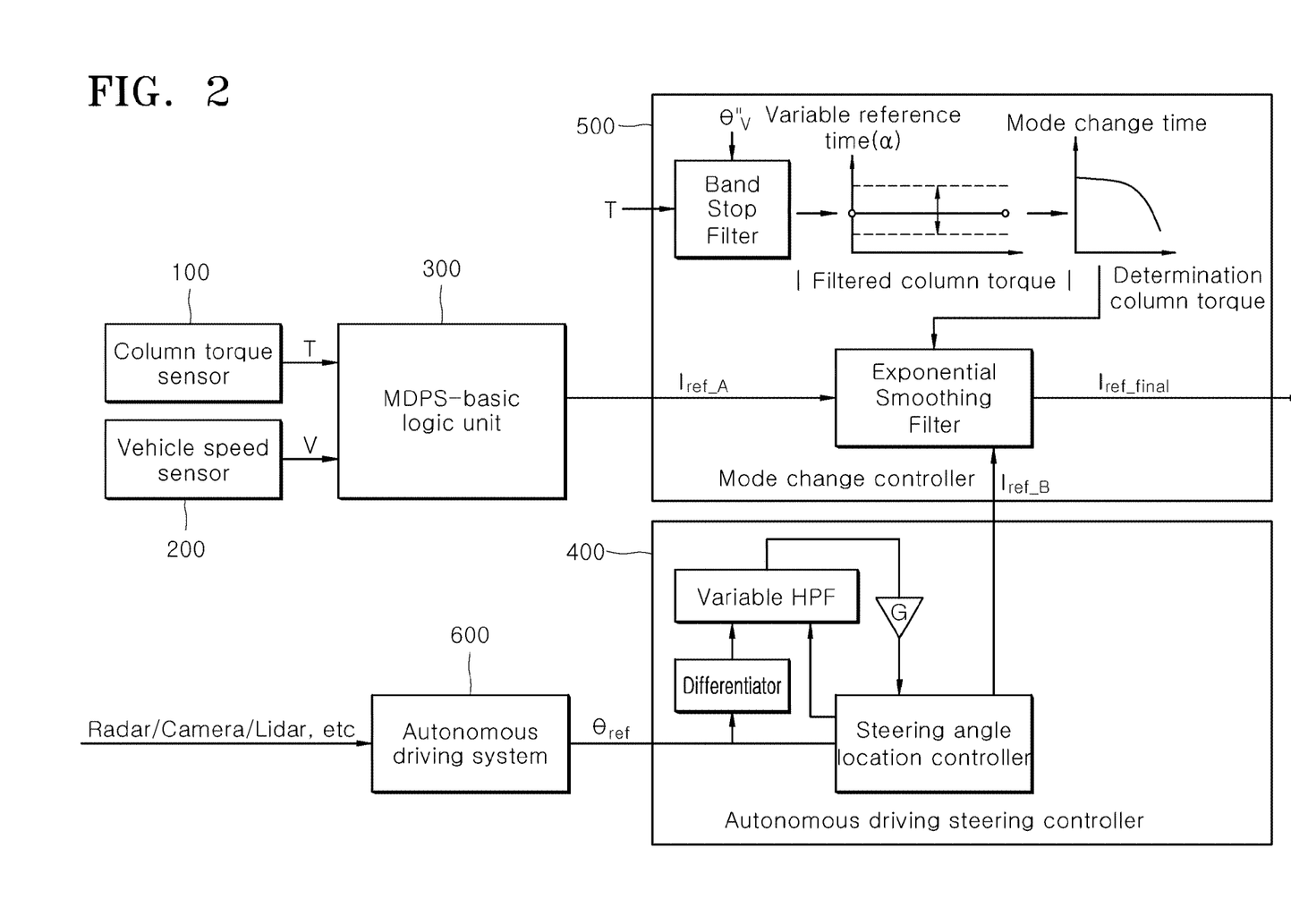
FIG. 2 is a block diagram illustrating detailed elements of the apparatus for controlling an MDPS system according to an embodiment of the present disclosure.

Hereinafter, embodiments of an apparatus and method for controlling a motor-driven power steering (MDPS) system will be described with reference to the accompanying drawings. The thickness of lines or the sizes of elements shown in the drawings in a process of describing this specification may have been exaggerated for the clarity of a description and for convenience' sake. Terms to be described below are defined by taking into consideration their functions in the present disclosure, and may be different depending on a user or operator's intention or practice. Accordingly, such terms should be interpreted based on the overall contents of this specification FIG. 1 is a block diagram illustrating an apparatus for controlling an MDPS system according to an embodiment of the present disclosure. FIG. 2 is a block diagram illustrating detailed elements of the apparatus for controlling an MDPS system according to an embodiment of the present disclosure.

Referring to FIG. 1, the apparatus for controlling an MDPS system according to an embodiment of the present disclosure may include a column torque sensor 100, a vehicle speed sensor 200, an MDPS-basic logic unit 300, an autonomous driving steering controller 400, and a mode change controller 500.

The column torque sensor 100 may detect column torque (T) applied to the steering column of a vehicle and deliver the column torque (T) to the MDPS-basic logic unit 300 and the mode change controller 500 to be described later. The column torque (T) applied to the steering column may include not only column torque applied by a driver, but noisy column torque occurring in a situation unintended by the driver, such as column torque in a resonant frequency region which is caused based on the mechanical mechanism of the MDPS system mounted on the vehicle. The noisy column torque may be filtered out (or removed) through a filter unit to be described later.

The vehicle speed sensor 200 may detect a vehicle speed (V) of the vehicle. The vehicle speed sensor 200 may include all of various sensors, such as a sensor for detecting the vehicle speed using the rotation speed of a wheel, a sensor for detecting the vehicle speed by measuring a revolution per minute (RPM), and a sensor for detecting the vehicle speed using a global positioning system (GPS).

The MDPS-basic logic unit 300 may determine a first auxiliary command current ($I_{ref\_A}$) for driving an MDPS motor in the manual driving mode (or manual steering mode) of a driver based on the column torque (T) and the vehicle speed (V) detected by the column torque sensor 100 and the vehicle speed sensor 200, respectively. The MDPS-basic logic unit 300 may determine the first auxiliary command current ($I_{ref\_A}$) for driving the MDPS motor in the manual driving mode in such a way to apply a boost curve to the column torque (T) and the vehicle speed (V). To this end, the MDPS-basic logic unit 300 may include an MDPS logic unit for calculating an auxiliary command current value based on the column torque (T) and the vehicle speed (V) using the boost curve and a motor controller for generating the first auxiliary command current ($I_{ref\_A}$) based on the calculated auxiliary command current value and controlling the MDPS motor.

The autonomous driving steering controller 400 may determine a second auxiliary command current ($I_{ref\_B}$) for driving the MDPS motor in the autonomous driving mode. The autonomous driving steering controller 400 may determine the second auxiliary command current ($I_{ref\_B}$) for driving the MDPS motor in the autonomous driving mode, based on a command steering angle ($\theta_{ref}$) determined by an autonomous driving system 600 of the vehicle depending on a driving environment of the vehicle detected by sensors (e.g., a radar sensor, a camera sensor, and a lidar sensor) mounted on the vehicle, the vehicle speed (V) detected by the vehicle speed sensor 200, and a current steering angle ($\theta v$) of the vehicle from a steering angle sensor (not illustrated). The autonomous driving steering controller 400 may determine the second auxiliary command current ($I_{ref\_B}$) in such a way to perform location control of the MDPS motor through proportional integral differential (PID) control based on the command steering angle ($\theta_{ref}$). To this end, the autonomous driving steering controller 400 may include a location controller and a speed controller for controlling the location and speed of the MDPS motor together in the autonomous driving mode.

The mode change controller 500 may determine the driver's steering intervention based on a variable reference time variably determined in accordance with the column torque (T) in the manual driving mode of the vehicle, may determine a mode change time from the autonomous driving mode to the manual driving mode based on the column torque (T), and may determine a final auxiliary command current ($I_{ref\_final}$) for driving the MDPS motor when a mode changes from the autonomous driving mode to the manual driving mode, by applying, to the first and second auxiliary command currents ($I_{ref\_A}$ and $I_{ref\_B}$), a weight into which the mode change time is incorporated.

Hereinafter, an operation of the mode change controller 500 is specifically described based on a configuration for determining a driver's steering intervention and a configuration for determining the final auxiliary command current and changing the autonomous driving mode into the manual driving mode.

Determination on driver's steering intervention will be described in accordance with present embodiments. As described above, the conventional MDPS system determines that a driver's steering intervention has occurred if the state in which the column torque (T) is a given level or more is maintained for a given time, and operates to release the autonomous driving mode. Accordingly, the conventional MDPS system has limitations in that the given time must be unconditionally maintained regardless of the size of column torque applied by a driver (i.e., regardless of the urgency of manual steering). As a result, the driver feels a great sense of entrapment or a sense of difference because manual steering is not performed during the given time, and rapid release of the autonomous driving mode and a rapid entry into the manual driving mode upon sudden steering are impossible.

As means for solving such problems, the present embodiment adopts a configuration for determining a driver's steering intervention based on a variable reference time variably determined in accordance with the column torque (T) in the manual driving mode of a vehicle.

Specifically, the mode change controller 500 may determine that a driver's steering intervention has occurred if the state in which the column torque (T) is a preset reference torque or more is maintained for a variable reference time or more. In this case, the variable reference time may be determined as a smaller value as the column torque (T) becomes greater (in this case, the reference torque is a value that is a criterion in order to determine whether the driver has a steering intention, and may be previously designed based on the specifications of the MDPS system and a designer's intention and preset in the mode change controller 500).

As the column torque (T) becomes greater may be considered a situation in which the driver has an urgent steering intention. In this case, the mode change controller 500 may operate to change the reference time, which functions as the time taken to determine the steering intervention, because it is necessary to rapidly change the autonomous driving mode into the manual driving mode by reducing the time taken to determine the steering intervention. Accordingly, as illustrated in FIG. 2, the mode change controller 500 may enable a rapid change into the manual driving mode in an urgent steering condition by determining a variable reference time (@) as a smaller value as the column torque (T) becomes greater and likewise determining the variable reference time (@) as a higher value as the column torque (T) becomes smaller. For example, the mode change controller 500 may determine the variable reference time corresponding to a currently detected column torque (T) with reference to a mapping table (or graph) between the column torque (T) and the variable reference time, such as Table 1 below, or corresponding relation information between the column torque (T) and the variable reference time, such as a function of the variable reference time for the column torque (T). The corresponding relation information between the column torque (T) and the variable reference time may be previously designed based on the specifications of the MDPS system and a designer's intention and preset in the mode change controller 500.

TABLE 1

| COLUMN TORQUE | VARIABLE REFERENCE TIME |
|---|---|
| 5 Nm | 50 ms |
| 6 Nm | 40 ms |
| 7 Nm | 30 ms |
| 8 Nm | 20 ms |
| 9 Nm | 10 ms |

It the variable reference time is adopted, the time taken to determine a steering intervention is reduced because the variable reference time is reduced as the column torque (T) becomes greater, thus enabling a faster change into the manual driving mode. An embodiment in which a driver's steering intervention is not determined as the column torque (T) converges on 0 may be taken into consideration. In this case, a reference value of the column torque (T) at which the driver's steering intervention is not determined may also be previously designed based on the specifications of the MDPS system and a designer's intention and may be incorporated into the corresponding relation information.

As described above, the column torque (T) applied to the steering column may include not only column torque applied by a driver, but noisy column torque occurring in a situation unintended by a driver (e.g., a column torque occurring when a driver touches a steering wheel without a steering intention). As a case where the noisy column torque is a reference torque or more, if the noisy column torque is maintained for a variable reference time or more determined based on the corresponding noisy column torque, there may occur a situation in which a driver's steering intervention has occurred based on the noisy column torque although the driver does not have a steering intervention intention. Accordingly, it is necessary to filter out (or remove) such noisy column torque and determine a driver's steering intervention based on a filtered column torque (specifically, an absolute value of the filtered column torque).

In order to filter out the noisy column torque, the mode change controller 500 may include a filter unit (or band stop filter) for filtering the column torque (T) in a given frequency band, as illustrated in FIG. 2. A frequency band filtered by the filter unit may be determined based on a steering angular acceleration (θ"v) of a steering wheel, and may be determined to include a resonant frequency caused based on the mechanical mechanism of the MDPS system (i.e., the frequency filtering band of the filter unit may be determined to include a resonant frequency determined based on the steering angular acceleration (θ"v)).

Specifically, the noisy column torque corresponds to vibration in a resonant frequency region according to the mechanical mechanisms, such as the steering wheel, universal joint, and torsion bar of the MDPS system. Vibration in the resonant frequency region cannot be perfectly removed through a conventional low pass filter (LPF). Accordingly, the present embodiment adopts a configuration for finding out a resonant frequency into which the mechanical mechanisms (e.g., the inertia and stiffness of the steering wheel, the universal joint, and the torsion bar) of the MDPS system are incorporated, and filtering the resonant frequency through the band stop filter.

In general, the resonant frequency may be modeled as $$1/(2*pi)*\sqrt{\frac{K}{J}}.$$

In this case, K means a parameter (in general, 2.1 to 2.8 Nm/deg) which is preset depending on a characteristic of the torsion bar. J is an inertia moment and may be preset through tests because it is a parameter that varies depending on the universal joint, the diameter of a steering wheel, and the steering angular acceleration (θ"v). Accordingly, the resonant frequency may also be preset as a value having a given range. For example, assuming that the resonant frequency has been preset as a value of 8 to 10 Hz, a factor to affect the resonant frequency is the steering angular acceleration (θ"v). Accordingly, a problem in that a driver's steering intervention is erroneously determined due to the noisy column torque can be solved by determining the resonant frequency, that is, a target to be filtered, to have a higher value within a range of 8 Hz to 10 Hz as the steering angular acceleration (θ"v) has a higher value and designating the frequency filtering region of the filter unit (i.e., the band stop filter) so that the column torque (T) is filtered in the determined resonant frequency region. In this case, the mode change controller 500 may determine the resonant frequency corresponding to a currently calculated steering angular acceleration (θ"v) with reference to a mapping table between the steering angular acceleration (θ"v) and the resonant frequency or corresponding relation information between the steering angular acceleration (θ"v) and the resonant frequency, such as or a function of the resonant frequency for the steering angular acceleration (θ"v). The corresponding relation information between the steering angular acceleration (θ"v) and the resonant frequency may be previously designed based on the specifications of the MDPS system and a designer's intention and preset in the mode change controller 500.

A configuration for determining a driver's direct steering intervention while a vehicle travels in the autonomous driving mode has been mainly described. However, it is also necessary to consider a situation in which urgent obstacle avoidance is required through automatic steering during driving in the autonomous driving mode. That is, in an urgent situation in which obstacle avoidance is required during driving in the autonomous driving mode, when a command steering angle (θ$_{ref}$) based on an urgent steering command is input from the autonomous driving system 600, actual column torque is greatly increased. This corresponds to a case where the column torque (T) is increased by urgent automatic steering for obstacle avoidance in a process of the autonomous driving mode being performed normally, not a driver's steering intervention. Accordingly, the autonomous driving mode needs to be maintained without any change.

To this end, the mode change controller 500 may perform a process (called a limit process, for convenience sake) of limiting the determination on the driver's steering intervention based on column torque (T) and a variable reference time, based on an angular acceleration of a command steering angle (i.e., the command steering angle (θ$_{ref}$) received from the autonomous driving system 600) determined depending on a driving environment of a vehicle. In this case, the angular acceleration of the command steering angle ($\theta_{ref}$) may be calculated by twice differentiating the command steering angle ($\theta_{ref}$). LPF processing for noise removal may be further performed.

That is, although column torque (T) is determined to be a reference torque or more, when the angular acceleration of the command steering angle ($\theta_{ref}$) is great, this may be considered that the column torque (T) has increased due to urgent automatic steering in a process of the autonomous driving mode being performed, not a driver's steering intervention. In this case, the mode change controller 500 may limit determination on the driver's steering intervention.

As an example of the limit process, the mode change controller 500 may use a method of increasing a variable reference time as an angular acceleration of the command steering angle ($\theta_{ref}$) becomes greater (i.e., a method of delaying determination on a driver's steering intervention by increasing the variable reference time when the angular acceleration of the command steering angle ($\theta_{ref}$) is a preset reference value or more although a column torque (T) equal to or greater than a reference torque is detected and the variable reference time having a small value is determined), or a method of stopping determination on a driver's steering intervention itself based on column torque (T) and a variable reference time when an angular acceleration of the command steering angle ($\theta_{ref}$) is a preset reference value or more.

Change from the autonomous driving mode to the manual driving mode will be described in accordance with present embodiments. As described above, a motor control current may greatly change because a driver's sudden steering occurs in a process of location control of MDPS being performed through the autonomous driving modules, and thus a driver's steering sense of difference may be caused. That is, when a mode changes from the autonomous driving mode to the manual driving mode, instant control stability is reduced due to an output difference in each mode control situation. This may lead to a sense of difference, such as an abnormal behavior or steering vibration of a vehicle.

As means for solving such problems, the present embodiment adopts a configuration for performing a mode change using a method of determining a mode change time from the autonomous driving mode to the manual driving mode based on column torque (T) and determining the final auxiliary command current ($I_{ref\_final}$) for driving the MDPS motor upon change from the autonomous driving mode to the manual driving mode, by applying, to the first and second auxiliary command currents ($I_{ref\_A}$ and $I_{ref\_B}$), a weight into which the mode change time is incorporated.

Specifically, the mode change controller 500 may determine the mode change time based on column torque (indicated as a "determination column torque", for convenience sake) at timing at which a driver's steering intervention is determined to have occurred. The determination column torque may be represented as column torque at timing at which a time for which the column torque (T) is maintained as a preset reference torque or more reaches a variable reference time. In this case, the mode change time from the autonomous driving mode to the manual driving mode may be determined as a smaller value as the determination column torque becomes greater.

That is, as the determination column torque becomes greater, this may be considered to be a situation in which a driver has an urgent steering intention. In this case, since it is necessary to rapidly change the autonomous driving mode into the manual driving mode by reducing the time taken for the mode change, the mode change controller 500 may operate to change the mode change time for the change into the manual driving mode based on the determination column torque. Accordingly, as illustrated in FIG. 2, the mode change controller 500 may enable a rapid change into the manual driving mode in an urgent steering condition by determining the mode change time as a smaller value as the determination column torque becomes greater and likewise determining the mode change time as a higher value as the determination column torque becomes smaller. For example, the mode change controller 500 may determine a mode change time corresponding to a currently detected determination column torque with reference to a mapping table (or graph) between the determination column torque and the mode change time or corresponding relation information between the determination column torque and the mode change time, such as a function of the mode change time for the determination column torque. The corresponding relation information between the determination column torque and the mode change time may be previously designed based on the specifications of the MDPS system and a designer's intention, and may be preset in the mode change controller 500. Furthermore, the mode change time may be determined as a smaller value in the entire region of the determination column torque, as the determination column torque becomes greater, and may be determined as a smaller value only in some regions of the determination column torque, as the determination column torque becomes greater. That is, the mode change controller 500 may determine the mode change time as a smaller value in at least a part of the region of the determination column torque, as the determination column torque becomes greater.

When the mode change time is determined through the aforementioned process, the mode change controller 500 may operate to complete a change from the autonomous driving mode to the manual driving mode within the determined mode change time. Such a configuration is specifically described below.

First, the mode change controller 500 may determine the final auxiliary command current ($I_{ref\_final}$) for driving the MDPS motor upon mode change, by applying, to the first and second auxiliary command currents ($I_{ref\_A}$ and $I_{ref\_B}$), a weight into which the mode change time is incorporated. In this case, the mode change controller 500 may determine the final auxiliary command current ($I_{ref\_final}$) by complementarily applying the weight to each of the first and second auxiliary command currents ($I_{ref\_A}$ and $I_{ref\_B}$), and may determine the final auxiliary command current ($I_{ref\_final}$) so that the final auxiliary command current becomes closer from the second auxiliary command current ($I_{ref\_B}$) to the first auxiliary command current ($I_{ref\_A}$) as a value of the weight changes from a lower value to a higher value. That is, as a value of the weight K changes from a lower value to a higher value, a proportion of the first auxiliary command current ($I_{ref\_A}$) is increased and a proportion of the second auxiliary command current ($I_{ref\_B}$) is decreased, which are incorporated into the final auxiliary command current ($I_{ref\_final}$). The final auxiliary command current ($I_{ref\_final}$) may be determined by an exponential smoothing filter, such as Equation 1 below.

$$I_{ref\_final} = KI_{ref\_A} + (1 - K)I_{ref\_B} \tag{1}$$

According to Equation 1, as the value K converges on 1, the final auxiliary command current ($I_{ref\_final}$) becomes closer to the first auxiliary command current ($I_{ref\_A}$). As the value K converges on 0, the final auxiliary command current ($I_{ref\_final}$) becomes closer to the second auxiliary command current ($I_{ref\_B}$).

Accordingly, when a driver intends to release the autonomous driving mode through forced steering in the autonomous driving mode, an autonomous driving gain (i.e., 1−K in Equation 1) applied to the second auxiliary command current ($I_{ref\_B}$) is gradually decreased and a gain (i.e., the weight K) applied to the first auxiliary command current ($I_{ref\_A}$) is gradually increased. Accordingly, when a mode changes from the autonomous driving mode to the manual driving mode, more natural release of the autonomous driving mode is made possible without a sense of difference in the steering wheel.

Furthermore, in Equation 1, the weight K may be designed to vary within a range between a preset lower limit (e.g., a value of 0) or more and a preset upper limit (e.g., a value of 1) or less using the mode change time as a factor, so that the change from the autonomous driving mode to the manual driving mode performed according to Equation 1 may be completed within the mode change time. That is, if the weight is represented as "$x/T_{translate}$" ($T_{translate}$ is the mode change time) and the parameter x is gradually changed from 0 to $T_{translate}$, a value of the weight changes from 0 to 1 within the mode change time so that the final auxiliary command current reaches the first auxiliary command current ($I_{ref\_A}$). Accordingly, the mode change is completed.

Accordingly, the time taken for the mode change is reduced because the mode change time is determined based on great column torque applied in a situation a driver has an urgent steering intention. Furthermore, more natural release of the autonomous driving mode is made possible without a sense of difference in the steering wheel by applying the exponential smoothing filter such as Equation 1.

Control responsiveness of the MDPS system in the autonomous driving mode will be described in accordance with present embodiments. As described above, the autonomous driving steering controller 400 may include the location controller and the speed controller for controlling the location and speed of the MDPS motor in the autonomous driving mode. In general, proportional (P) control is applied to the location controller, and proportional integral (PI) control is applied to the speed controller. In this case, since an increase in control responsiveness is limited, a low pass filter (LPF) is commonly applied to the front end of a differential (D) controller. In this case, however, the structure of the MDPS system is complicated, and it is difficult to control the MDPS motor because a tuning factor is increased.

In order to simplify the structure of the MDPS system and optimize the tuning factor while increasing control responsiveness, the autonomous driving steering controller 400 according to the present embodiment may be designed to determine the second auxiliary command current ($I_{ref\_B}$) using a variable high pass filter (HPF), having a cutoff frequency variably determined based on an angular velocity of the command steering angle ($\theta_{ref}$), and a differential (D) control gain calculated based on a location control gain of PID control and a differential parameter (or differential time).

Specifically, in a common PID controller, when an LPF or a lag-compensator is applied to a D controller, a transfer function is represented like Equation 2.

$$G(s) = K_p \left(1 + \frac{1}{Ti \cdot s} + \frac{Td \cdot s}{1 + s \cdot Td}\right) \quad (2)$$

In Equation 2, $K_p$ means a location control gain. Ti and Td are control times of the D controllers, respectively, that is, mean an integration time and a differential time.

In Equation 2, if the location control gain ($K_p$) is separated into an integration control gain ($K_i$) and a differential control gain ($K_d$), the integration control gain ($K_i$) and the differential control gain ($K_d$) are arranged to obtain Equation 3.

$$G(s) = K_p + \frac{K_i}{Ti \cdot s} + \frac{K_d \cdot Td \cdot s}{1 + s \cdot Td} \quad (3)$$

In Equation 3, the differential control term is arranged again to obtain Equation 4.

$$\frac{\frac{1}{T_d}}{\frac{1}{T_d} + s} K_d \cdot T_d \cdot s \quad (4)$$

In Equation 4, it may be seen that the term $$\frac{\frac{1}{T_d}}{\frac{1}{T_d} + s}$$

has a form of a primary HPF. Accordingly, if an LPF or lag-compensator is not applied to the D controller, but a specified D control gain G is set and the HPF is applied to the D controller, a system structure having high control responsiveness and being strong against noise and disturbance can be designed.

By applying the design method, a design may be considered in which a response to vibration and disturbance is not generated in such a manner that if the command steering angle ($\theta_{ref}$) of the location controller is fast (i.e., if the angular velocity of the command steering angle ($\theta_{ref}$) is great), a gain and frequency response necessary for a steering region are increased by lowering the cutoff frequency of the HPF and if the command steering angle ($\theta_{ref}$) of the location controller is slow (i.e., if the angular velocity of the command steering angle ($\theta_{ref}$) is small), a response is made insensitive to noise by increasing the cutoff frequency of the HPF.

Accordingly, in the present embodiment, as illustrated in FIG. 2, the autonomous driving steering controller 400 may determine the second auxiliary command current ($I_{ref\_B}$) using a variable HPF, having a cutoff frequency variably determined based on an angular velocity of the command steering angle ($\theta_{ref}$), and the D control gain G ($G=K_p*Td$) calculated based on the location control gain ($K_p$) of PID control and the differential parameter (Td). If sudden avoidance steering is necessary in the autonomous driving mode, location control of the MDPS motor can be performed very effectively and actively through the design. Furthermore, if a control response continues to be increased, upon normal driving, performance of location control is reduced because disturbance or noise is amplified, but performance of location control can be maintained and driving stability can be improved through the design. As illustrated in FIG. 2, an error value between a current steering angle ($\theta_v$) and the command steering angle ($\theta_{ref}$) is input to the variable HPF as an input. The cutoff frequency is determined based on an angular velocity of the command steering angle ($\theta_{ref}$). The D control gain G is calculated by multiplying the location control gain ($K_p$) by the differential time (Td).

Figure 3:
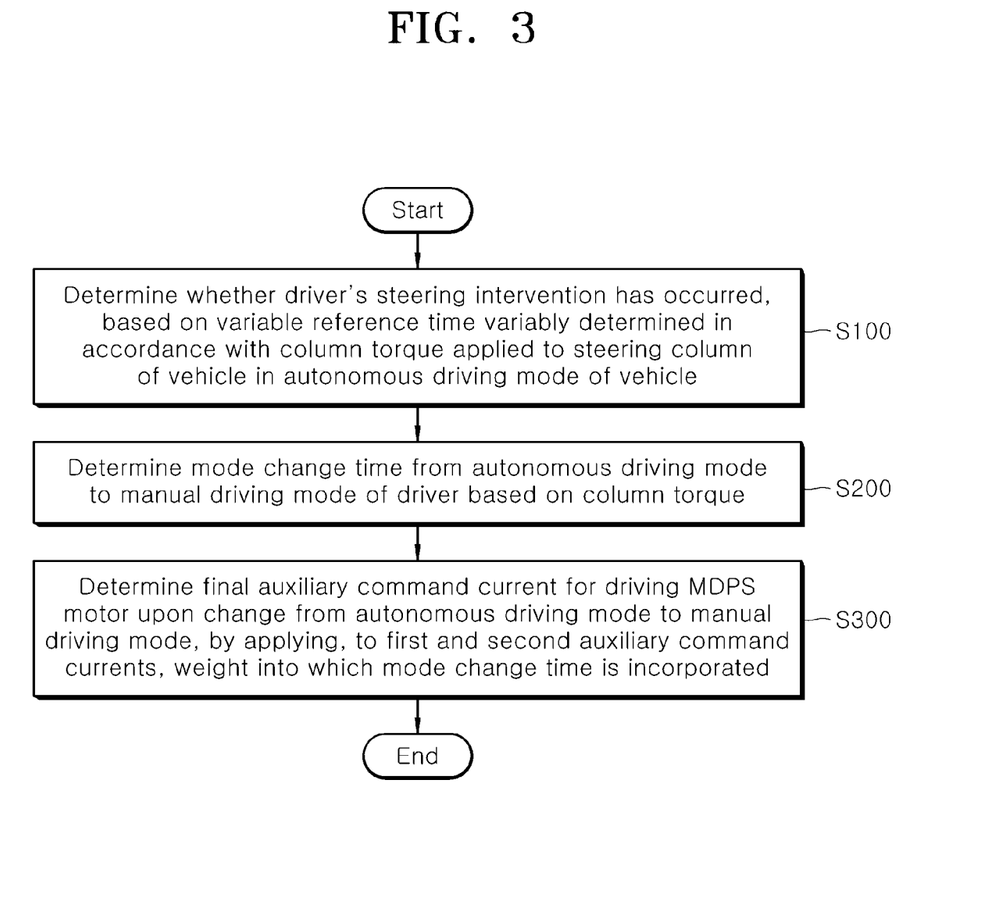
FIG. 3 is a flowchart illustrating a method of controlling an MDPS system according to an embodiment of the present disclosure.

FIG. 3 is a flowchart illustrating a method of controlling an MDPS system according to an embodiment of the present disclosure. Hereinafter, the method of controlling a MDPS system according to the present embodiment is described with reference to FIG. 3, and a description redundant with the aforementioned description is omitted, for convenience sake.

First, the mode change controller 500 determines whether a driver's steering intervention has occurred, based on a variable reference time variably determined in accordance with column torque (T) applied to the steering column of a vehicle in the autonomous driving mode of the vehicle (S100).

At step S100, if the state in which the column torque (T) is a preset reference torque or more is maintained for the variable reference time or more, the mode change controller 500 may determine that the driver's steering intervention has occurred. In this case, the mode change controller 500 may determine the variable reference time as a smaller value as the column torque (T) becomes greater. Furthermore, at step S100, the mode change controller 500 may filter the column torque (T) in a frequency band, which is determined based on a steering angular acceleration ($\theta''v$) of the steering wheel of the vehicle and determined to include a resonant frequency caused based on the mechanical mechanism of an MDPS system mounted on the vehicle, and may determine the driver's steering intervention based on the filtered column torque.

At step S100, the mode change controller 500 may perform a limit process of limiting the determination on the driver's steering intervention based on the column torque (T) and the variable reference time depending on an angular acceleration of a command steering angle ($\theta_{ref}$). A method of increasing the variable reference time as the angular acceleration of the command steering angle ($\theta_{ref}$) becomes greater, or a method of stopping determination on the driver's steering intervention based on the column torque (T) and the variable reference time if the angular acceleration of the command steering angle ($\theta_{ref}$) is the preset reference value or more may be applied as a method for the limit process.

If the driver's steering intervention is determined to have occurred at step S100, the mode change controller 500 determines a mode change time from the autonomous driving mode to the manual driving mode of the driver based on the column torque (T) (S200).

At step S200, the mode change controller 500 may determine the mode change time based on determination column torque, that is, column torque at timing at which the driver's steering intervention is determined to have occurred, and may determine the mode change time as a smaller value in at least a part of the region of the determination column torque, as the determination column torque is greater.

Next, the mode change controller 500 determines a final auxiliary command current ($I_{ref\_final}$) for driving the MDPS motor upon change from the autonomous driving mode to the manual driving mode, by applying, to first and second auxiliary command currents ($I_{ref\_A}$ and $I_{ref\_B}$), a weight into which the mode change time is incorporated. As described above, the first and second auxiliary command currents ($I_{ref\_A}$ and $I_{ref\_B}$) correspond to currents for driving the MDPS motor in the manual driving mode and the autonomous driving mode, respectively (S300).

At step S300, the mode change controller 500 may determine the final auxiliary command current ($I_{ref\_final}$) by complementarily applying the weight to each of the first and second auxiliary command currents ($I_{ref\_A}$ and $I_{ref\_B}$), and may determine the final auxiliary command current ($I_{ref\_final}$) so that the final auxiliary command current becomes close from the second auxiliary command current ($I_{ref\_B}$) to the first auxiliary command current ($I_{ref\_A}$) as a value of the weight changes from a lower value to a higher value. In this case, the weight may be designed to vary within a range between a preset lower limit or more and a preset upper limit or less using the mode change time as a factor. Accordingly, the mode change controller 500 may complete a change from the autonomous driving mode to the manual driving mode within the mode change time.

Additionally, the second auxiliary command current ($I_{ref\_B}$) may be determined in such a manner that location control of the MDPS motor is performed through PID control based on the command steering angle ($\theta_{ref}$), and may be determined by taking into consideration a variable high pass filter (HPF), having a cutoff frequency variably determined based on an angular velocity of the command steering angle ($\theta_{ref}$), and a differential (D) control gain G calculated based on the location control gain of PID control and a differential parameter.

As described above, according to the present embodiment, when a mode changes from the autonomous driving mode to the manual driving mode, a driver's steering intervention is determined using a variable reference time actively changed based on column torque. Accordingly, upon sudden steering, rapid release of the autonomous driving mode and a rapid entry into the manual driving mode can be made possible. Furthermore, the driving of the MDPS motor is controlled by optimally determining auxiliary command currents for the driving of the MDPS motor through a given weight into which a time taken for a mode change is incorporated. Accordingly, upon mode change, control stability for MDPS can be secured, and a sense of difference, such as an abnormal behavior or steering vibration of a vehicle, can be reduced.

An implementation described in this specification may be realized as a method or process, apparatus, software program, data stream or signal, for example. Although the present disclosure has been discussed only in the context of a single form of an implementation (e.g., discussed as only a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device which facilitates the communication of information between end-users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling a motor-driven power steering (MDPS) system, comprising:
an MDPS-basic logic unit configured to determine a first auxiliary command current and drive an MDPS motor in a manual driving mode of a driver based on column torque applied to a steering column of a vehicle and a vehicle speed of the vehicle;
an autonomous driving steering controller configured to determine a second auxiliary command current to drive the MDPS motor in an autonomous driving mode of the vehicle; and
a mode change controller configured to determine a driver's steering intervention using a variable reference time that is variably determined in accordance with the column torque in the manual driving mode of the vehicle, determine a mode change time from the autonomous driving mode to the manual driving mode based on the column torque, and determine a final auxiliary command current for driving the MDPS motor based upon change from the autonomous driving mode to the manual driving mode, by applying, to the first and second auxiliary command currents, a weight into which the mode change time is incorporated.

2. The apparatus of claim 1, wherein the mode change controller determines that the driver's steering intervention has occurred if a state in which the column torque is a preset reference torque or more is maintained for the variable reference time or more, and determines the variable reference time as a smaller value as the column torque becomes greater.

3. The apparatus of claim 2, wherein the mode change controller determines the mode change time based on a determination of column torque, which is column torque at a timing at which the driver's steering intervention is determined to have occurred, and determines the mode change time as a smaller value in at least a part of a region of the determination column torque, as the determination column torque becomes greater.

4. The apparatus of claim 1, wherein the mode change controller determines the final auxiliary command current by complementarily applying the weight to each of the first and second auxiliary command currents, and determines the final auxiliary command current so that the final auxiliary command current becomes closer from the second auxiliary command current to the first auxiliary command current as a value of the weight changes from a lower value to a higher value.

5. The apparatus of claim 4, wherein:
as the weight varies within a range between a preset lower limit or more and a preset upper limit or less using the mode change time as a factor,
the mode change controller completes the change from the autonomous driving mode to the manual driving mode within the mode change time.

6. The apparatus of claim 1, wherein the mode change controller is configured to:
Filter the column torque in a frequency band, which is determined based on a steering angular acceleration of a steering wheel of the vehicle and is determined to include a resonant frequency caused based on a mechanical mechanism of the MDPS system mounted on the vehicle, and
determine the driver's steering intervention based on the filtered column torque.

7. The apparatus of claim 1, wherein the autonomous driving steering controller is configured to:
determine the second auxiliary command current to perform location control of the MDPS motor through proportional integral differential (PID) control based on a determined command steering angle that depends on a driving environment of the vehicle, and
determine the second auxiliary command current using a variable high pass filter (HPF), having a cutoff frequency variably determined based on an angular velocity of the command steering angle, and a differential (D) control gain calculated based on a location control gain of the PID control and a differential parameter.

8. The apparatus of claim 1, wherein the mode change controller performs a limit process of limiting the determination on the driver's steering intervention based on the column torque and the variable reference time, based on a determined angular acceleration of the command steering angle that depends on the driving environment of the vehicle.

9. The apparatus of claim 8, wherein the mode change controller performs the limit process using a method of increasing the variable reference time as the angular acceleration of the command steering angle becomes greater, or a method of stopping the determination on the driver's steering intervention based on the column torque and the variable reference time when the angular acceleration of the command steering angle is a preset reference value or more.

10. A method of controlling a motor-driven power steering (MDPS) system, comprising:
determining, by a mode change controller, whether a driver's steering intervention has occurred, based on a variable reference time variably determined in accordance with column torque applied to a steering column of a vehicle in a manual driving mode of the vehicle;
determining, by the mode change controller, a mode change time from the autonomous driving mode to a manual driving mode of the driver based on the column torque if the driver's steering intervention is determined to have occurred; and
determining, by the mode change controller, a final auxiliary command current for driving an MDPS motor upon change from the autonomous driving mode to the manual driving mode, by applying, to first and second auxiliary command currents, a weight into which the mode change time is incorporated, wherein the first and second auxiliary command currents are currents for driving the MDPS motor in the manual driving mode and the autonomous driving mode, respectively.

11. The method of claim 10, wherein in the determining of whether the driver's steering intervention occurs, the mode change controller determines that the driver's steering intervention has occurred if a state in which the column torque is a preset reference torque or more is maintained for the variable reference time or more, and determines the variable reference time as a smaller value as the column torque becomes greater.

12. The method of claim 11, wherein in the determining of the mode change time, the mode change controller determines the mode change time based on determination column torque, which is column torque at a timing at which the driver's steering intervention is determined to have occurred, and determines the mode change time as a smaller value in at least a part of a region of the determination column torque, as the determination column torque becomes greater.

13. The method of claim 10, wherein in the determining of the final auxiliary command current, the mode change controller determines the final auxiliary command current by complementarily applying the weight to each of the first and second auxiliary command currents, and determines the final auxiliary command current so that the final auxiliary command current becomes closer from the second auxiliary command current to the first auxiliary command current as a value of the weight changes from a lower value to a higher value.

14. The method of claim 13, wherein:
as the weight varies within a range between a preset lower limit or more and a preset upper limit or less using the mode change time as a factor, the mode change controller completes the change from the autonomous driving mode to the manual driving mode within the mode change time.

15. The method of claim 10, wherein in the determining of whether the driver's steering intervention occurs, the mode change controller filters the column torque in a frequency band, which is determined based on a steering angular acceleration of a steering wheel of the vehicle and determined to comprise a resonant frequency caused based on a mechanical mechanism of the MDPS system mounted on the vehicle, and determines the driver's steering intervention based on the filtered column torque.

16. The method of claim 10, wherein:
the second auxiliary command current is determined in such a manner that location control of the MDPS motor is performed through proportional integral differential (PID) control based on a command steering angle determined depending on a driving environment of the vehicle, and the second auxiliary command current is determined by taking into consideration a variable high pass filter (HPF), having a cutoff frequency variably determined based on an angular velocity of the command steering angle, and a differential (D) control gain calculated based on a location control gain of the PID control and a differential parameter.

17. The method of claim 10, wherein in the determining of whether the driver's steering intervention occurs, the mode change controller performs a limit process of limiting the determination on the driver's steering intervention based on the column torque and the variable reference time, based on an angular acceleration of the command steering angle determined depending on the driving environment of the vehicle.

18. The method of claim 17, wherein in the determining of whether the driver's steering intervention occurs, the mode change controller performs the limit process using a method of increasing the variable reference time as the angular acceleration of the command steering angle becomes greater, or a method of stopping the determination on the driver's steering intervention based on the column torque and the variable reference time when the angular acceleration of the command steering angle is a preset reference value or more.

* * * * *